United States Patent
Brune

(10) Patent No.: US 8,251,405 B2
(45) Date of Patent: Aug. 28, 2012

(54) PRESSURIZED WATER CONTAINER

(75) Inventor: Dominik Brune, Ostbevern (DE)

(73) Assignee: OASE GmbH, Hörstel-Riesenbeck (DE)

( * ) Notice: Subject to any disclaimer, the term of this patent is extended or adjusted under 35 U.S.C. 154(b) by 354 days.

(21) Appl. No.: 12/053,557

(22) Filed: Mar. 22, 2008

(65) Prior Publication Data

US 2008/0230538 A1  Sep. 25, 2008

(30) Foreign Application Priority Data

Mar. 23, 2007 (DE) .......................... 10 2007 014 570

(51) Int. Cl.
F16L 17/00 (2006.01)
F16L 39/00 (2006.01)
F16L 55/00 (2006.01)
F16B 23/00 (2006.01)
E03B 9/20 (2006.01)

(52) U.S. Cl. ................. 285/11; 285/10; 285/29; 285/71; 285/80; 239/16; 239/22

(58) Field of Classification Search .................... 239/16, 239/17, 18, 19, 20, 22, 23; 220/4.21, 4.24, 220/4.25, 4.26, 4.27; 285/10, 11, 20, 26, 285/29, 33, 35, 38, 71, 80, 98

See application file for complete search history.

(56) References Cited

U.S. PATENT DOCUMENTS

| 2,110,133 | A | * | 3/1938 | Douglas | 362/651 |
| 3,785,559 | A | * | 1/1974 | Hruby, Jr. | 239/17 |
| 4,645,286 | A | * | 2/1987 | Isban et al. | 439/571 |
| 4,724,430 | A | * | 2/1988 | Igarashi | 340/693.11 |
| 5,240,596 | A | * | 8/1993 | Chesnut | 210/136 |
| 5,474,674 | A |   | 12/1995 | Bresolin et al. | |
| 7,001,510 | B1 | * | 2/2006 | Adame | 210/167.23 |
| 7,036,677 | B1 |   | 5/2006 | Funck et al. | |
| 2006/0054026 | A1 | * | 3/2006 | Seurat Guiochet et al. | 99/337 |
| 2007/0065316 | A1 |   | 3/2007 | Hanke et al. | |

FOREIGN PATENT DOCUMENTS

| CA | 2266824 | 9/1999 |
| DE | 3232949 | 3/1984 |
| DE | 19710807 | 9/1998 |

* cited by examiner

*Primary Examiner* — Len Tran
*Assistant Examiner* — Ryan Reis
(74) *Attorney, Agent, or Firm* — Gudrun E. Huckett

(57) ABSTRACT

A pressurized water container for water fountains, ponds, swimming pools, and aquariums has at least two housing parts and at least one seal arranged between the at least two housing parts, wherein the at least two housing parts are connectable to one another in a lockable way. The at least two housing parts have projections and matching recesses, wherein the projections engage the recesses and, by a displacement of the at least two housing parts relative to one another in opposite directions, they are lockable on one another and releasable from one another when reversing the displacement.

20 Claims, 7 Drawing Sheets

PRESSURIZED WATER CONTAINER

BACKGROUND OF THE INVENTION

The invention concerns a pressurized water container as it is used in connection with water fountain, pond, swimming pool or aquarium technology. Such pressurized water containers comprise at least two housing parts, between which at least one seal is arranged and which are connectable to one another in a lockable way. Water is forced through such containers under pressure and in this way, for example, filtered, supplied to a nozzle, or subjected to other similar mechanical actions. The container as well as the components arranged therein require a certain maintenance so that the container must be designed to be opened and closed again. Upon closing it is important to reinstate water seal-tightness that withstands the water pressures in operation. Conventional closure mechanisms are, for example, the connection of the housing parts by means of several clamps or toggle closures or by engaging a flange provided on both housing parts by means of a clamping ring. These closures are difficult to close properly by a single person. When using clamps or toggle closures the container parts must be pressed uniformly against one another, all damps must be closed while maintaining this pressure. A clamping ring must also be tightened and closed while both container parts are pressed against one another. When it is not possible to uniformly maintain the tension during the closing action on all container sides, canting occurs and this leads to a connection that is not seal-tight.

The invention has therefore the object to provide a pressurizable water container that can be closed in a simple way so as to be water-tight.

SUMMARY OF THE INVENTION

This object is solved according to the invention by a pressurized water container wherein the housing parts have projections and corresponding recesses that are designed such that the projections engage the recesses and, by displacement of the housing parts relative to one another in opposite directions, they are lockable on one another and releasable from one another when reversing the displacement.

By providing on the container parts projections and recesses matched to the projections which projections and recesses are arranged such that they secure the housing parts on one another when they are displaced relative to one another, the initiation of this displacement movement provides for a safe closure of the container even by a single person. Preferably, several projections and matching recesses should be provided on the housing parts and should preferably extend along the circumference of the container. A connection by means of at least three projections and recesses each that are uniformly distributed, i.e., arranged at a spacing of approximately 120 degrees relative to one another, can already provide a uniform sealing action. However by providing more than four projections and recesses, the canting tendency is further reduced and closing of the container becomes increasingly easier.

Even though it is possible to arrange the projections and recesses like a toothing alternately on a first housing part and a second housing part, it is advantageous with regard to manufacturing technology as well as with regard to simplifying operation to arrange the projections on the first housing part and the recesses on the second housing part.

The projections can effect by means of a slanted arrangement or a hook-shaped configuration a connection with the other housing part. Preferred is an embodiment in which the projections have terminal widened portions or thick portions and the recesses are over portions thereof of a tapering configuration so that the widened portions of the projections upon displacement of the housing parts relative to one another engage the recesses and in this way clamp the housing parts relative to one another.

BRIEF DESCRIPTION OF THE DRAWINGS

Further advantages and details result from the dependent claims and an embodiment of the invention illustrated in the drawings which embodiment will be described in the following. It is shown in:

DESCRIPTION OF PREFERRED EMBODIMENTS

Figure 1:
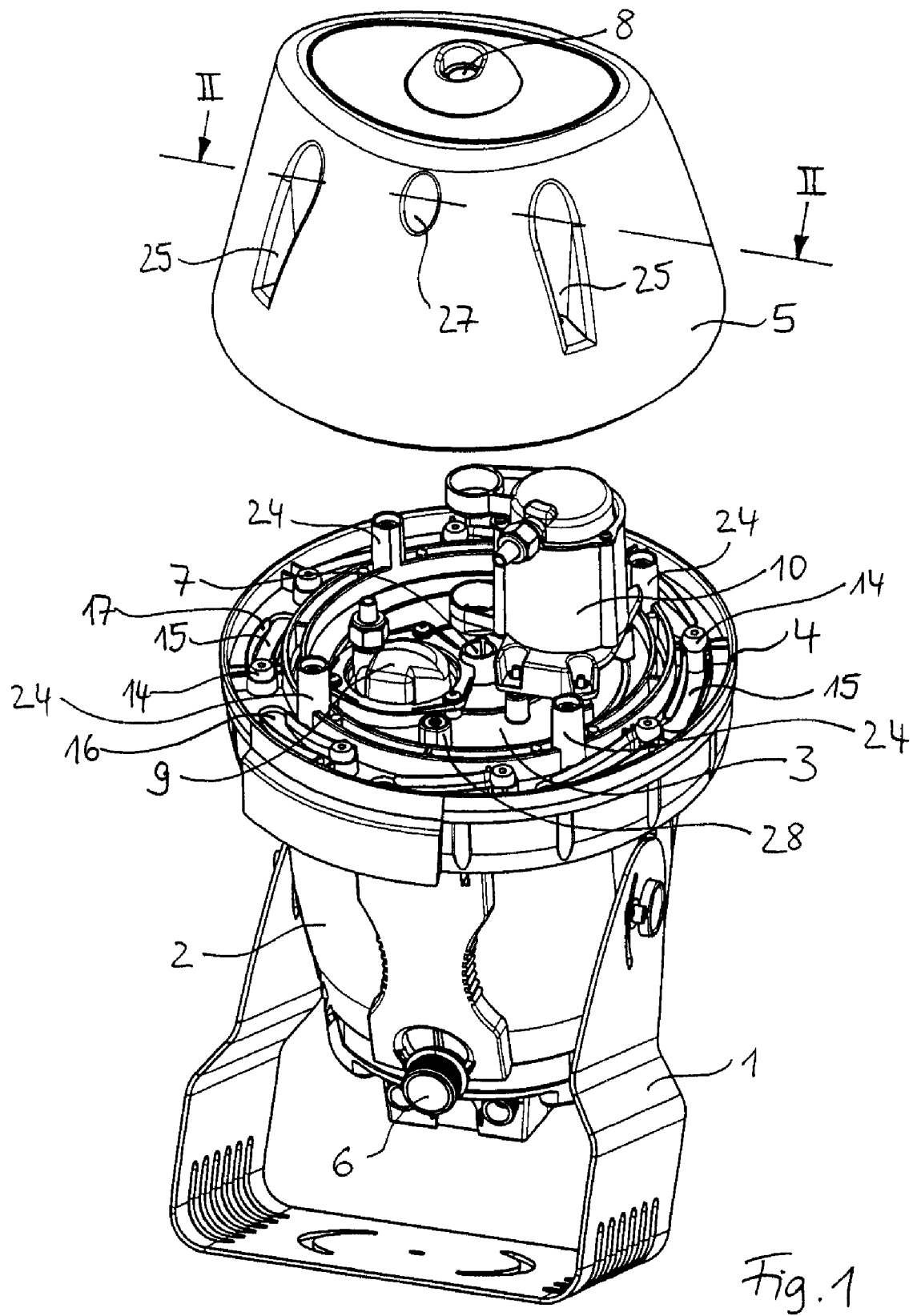
FIG. 1 a fountain jet generator with pressurized water container and removed lid.
Figure 3:
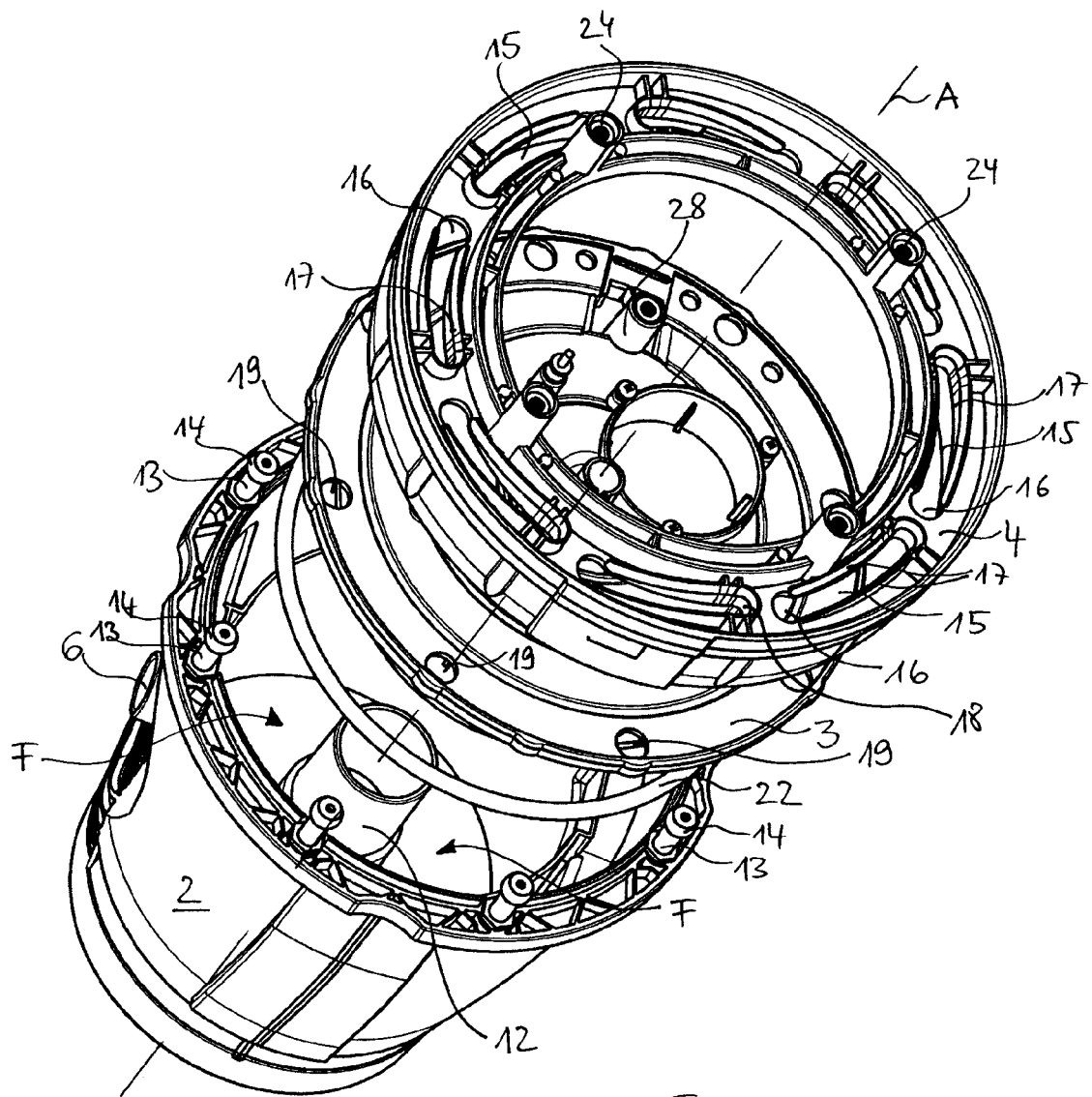
FIG. 3 an exploded illustration of the container of FIG. 1 without lid.

The invention will be explained in more detail with the aid of an embodiment in the form of a fountain jet generator that is illustrated most complete in FIG. 1. It is comprised of a pressurized water container connected to a support 1 and has a housing comprised of several housing parts 2, 3, 4, 5. The lower housing part 2 forms substantially the water container and is filled predominantly with filter foams, not illustrated, for calming the water. Through the inlet 6 water is conveyed under pressure into the container by means of a pump, not illustrated, and exits from the container through a nozzle 7 and a water outlet 8. The nozzle 7 is formed in a housing part 3 that closes off the area receiving the water in the upward direction which housing part will be explained in more detail later on. Above the housing part 3 further components are provided such as e.g. a turbulence generator 9 and an alignment actuator 10. The entire housing is closed off at the top by a lid 5. As can be seen in FIG. 3, the housing can moreover have a receptacle 12 into which a lighting device for illuminating the water jet can be inserted.

For closing off the container in accordance with the invention, the lower housing part 2 is provided with several projections 13, 14 that are formed by pins 13 with terminal spherical heads 14. These projections 13, 14 engage recesses 15 of the upper housing part 4 closing off the container. These recesses 15 have an enlarged open area 16 and lateral guides 17 adjoining them; they narrow the recesses 15 in such a way that the widened portion 14 of the spherical heads of the matching projections 13, 14 is engaged.

Figure 5:
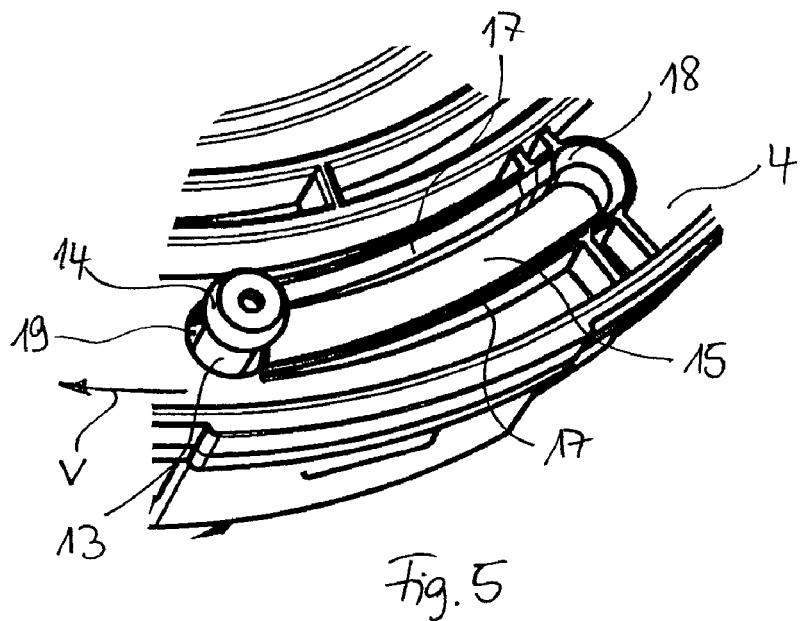
FIG. 5 a detail of FIG. 4 before closing.
Figure 6:
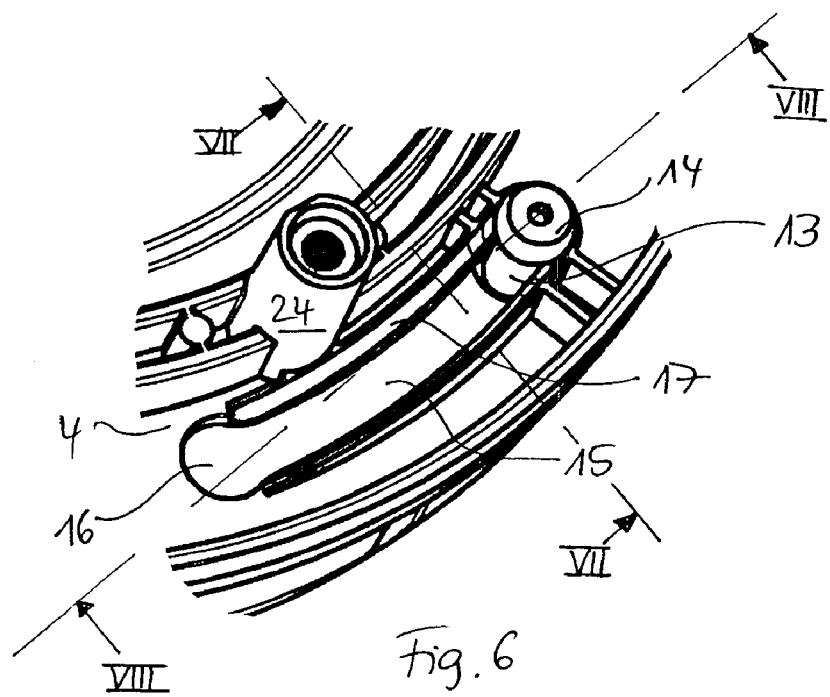
FIG. 6 the detail of FIG. 5 after carrying out the closing movement.
Figure 7:
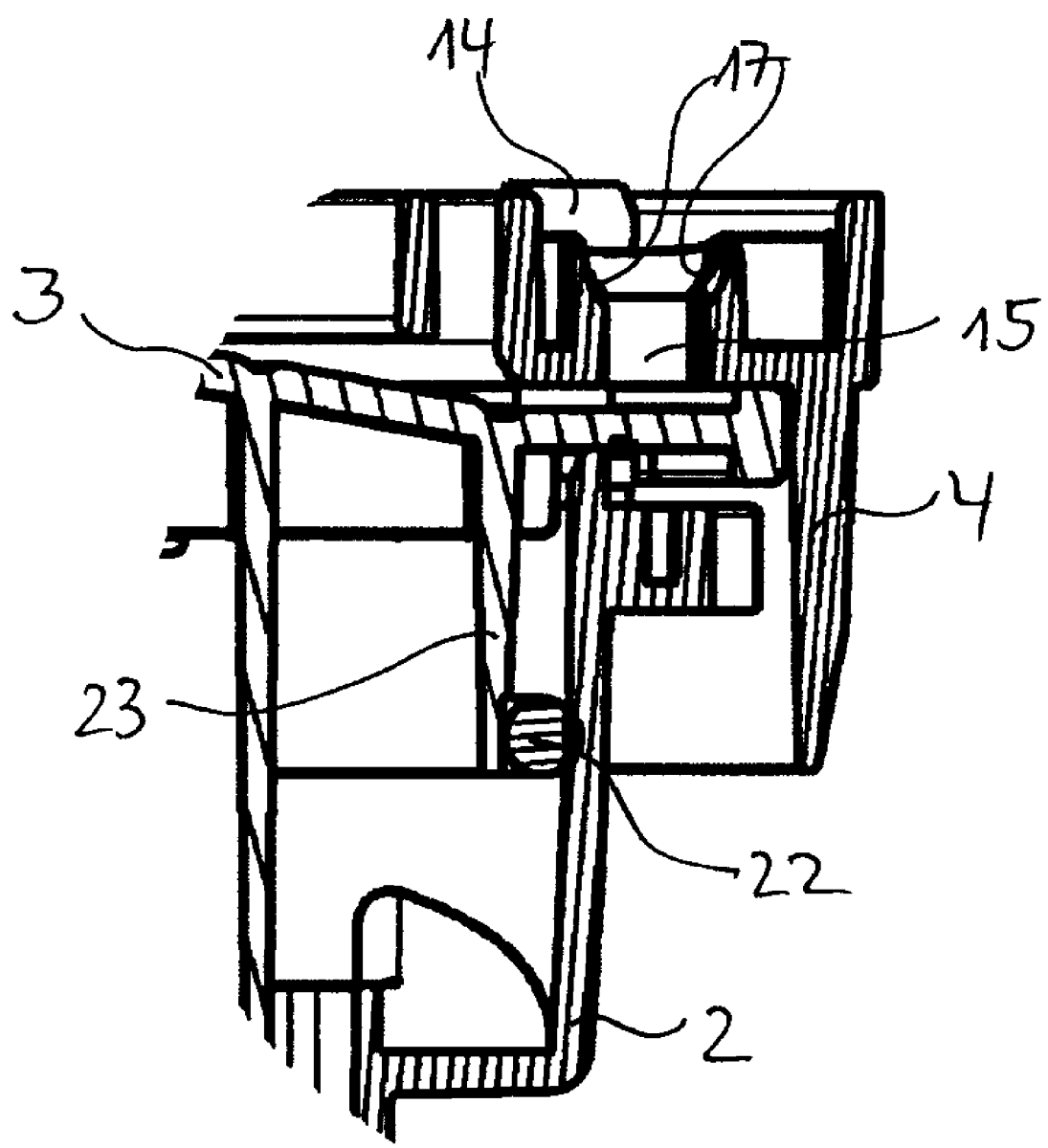
FIG. 7 a section view in the direction VII-VII of the article of FIG. 6.
Figure 8:
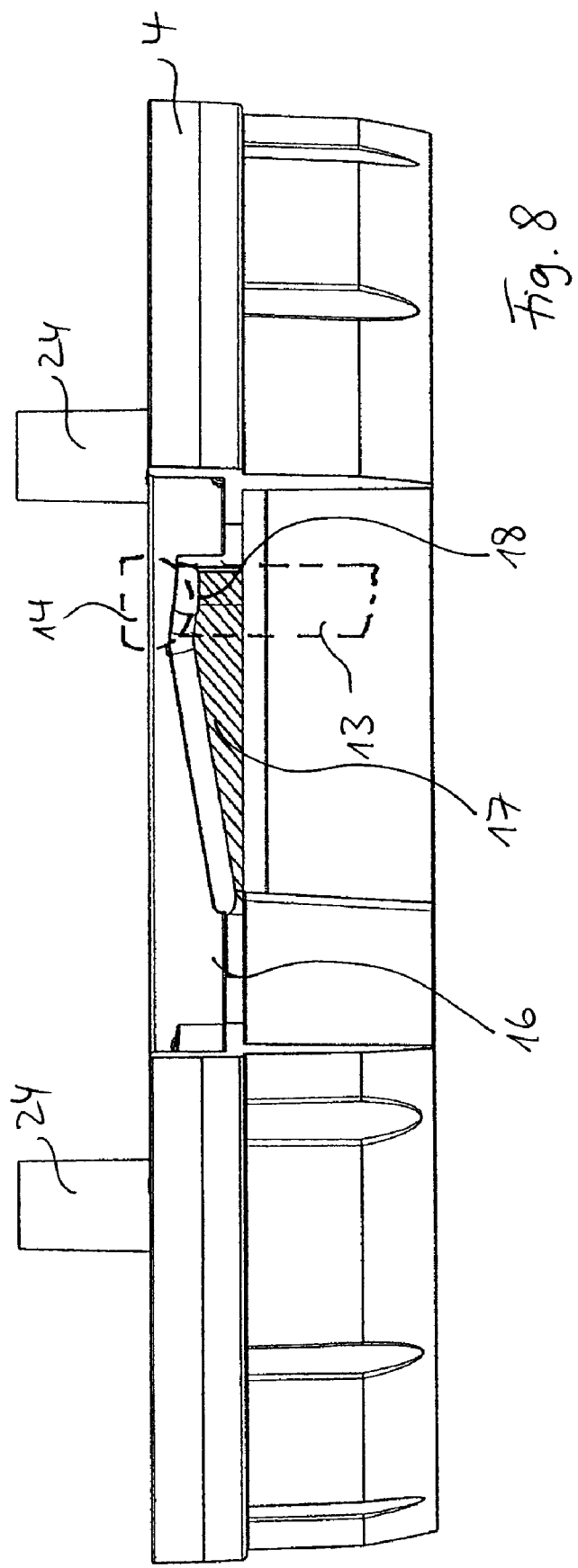
FIG. 8 a section view in the direction VIII-VIII of the article of FIG. 6.

When closing the container, which is realized by a sliding movement of the upper housing part 4 in the direction of arrow V in FIG. 5 into the position illustrated in FIG. 6, the lateral flanges 17 of the recesses 15 engaging the spherical heads 14 provide a forced guiding action for the displacement movement of the housing parts 2 and 4 relative to one another. This lateral guides 17 are designed, as can be clearly seen in FIG. 8, like an ascending ramp so that when the closing movement is carried out the upper housing part 4 will be automatically pulled closer against the lower housing part 2. In order to be able to carry out the closing movement with as little force as possible, the lateral guides 17, as shown in FIG. 7, are matched in their upper area to the shape of the spherical head 14 of the projections 13, 14. A spherical head in the context of the invention is not to be understood exclusively as a completely spherical shape but also a shape that simply widens in the upper area 14 of the projections 13, 14 in such a way so as to be beneficial with regard to gliding. In particular, it can also be cut off at the top as illustrated. In order to provide a certain locking action of the housing connection, the guides 17, as shown in FIG. 8, are designed such that in the closed position they drop off or are recessed in the end area 18 of the recesses 15 relative to the projections 13,14. In this way it is prevented that the projections 13, 14 can slide automatically back into the recesses 15 and a tactile signal is provided that the locked position has been reached.

Figure 4:
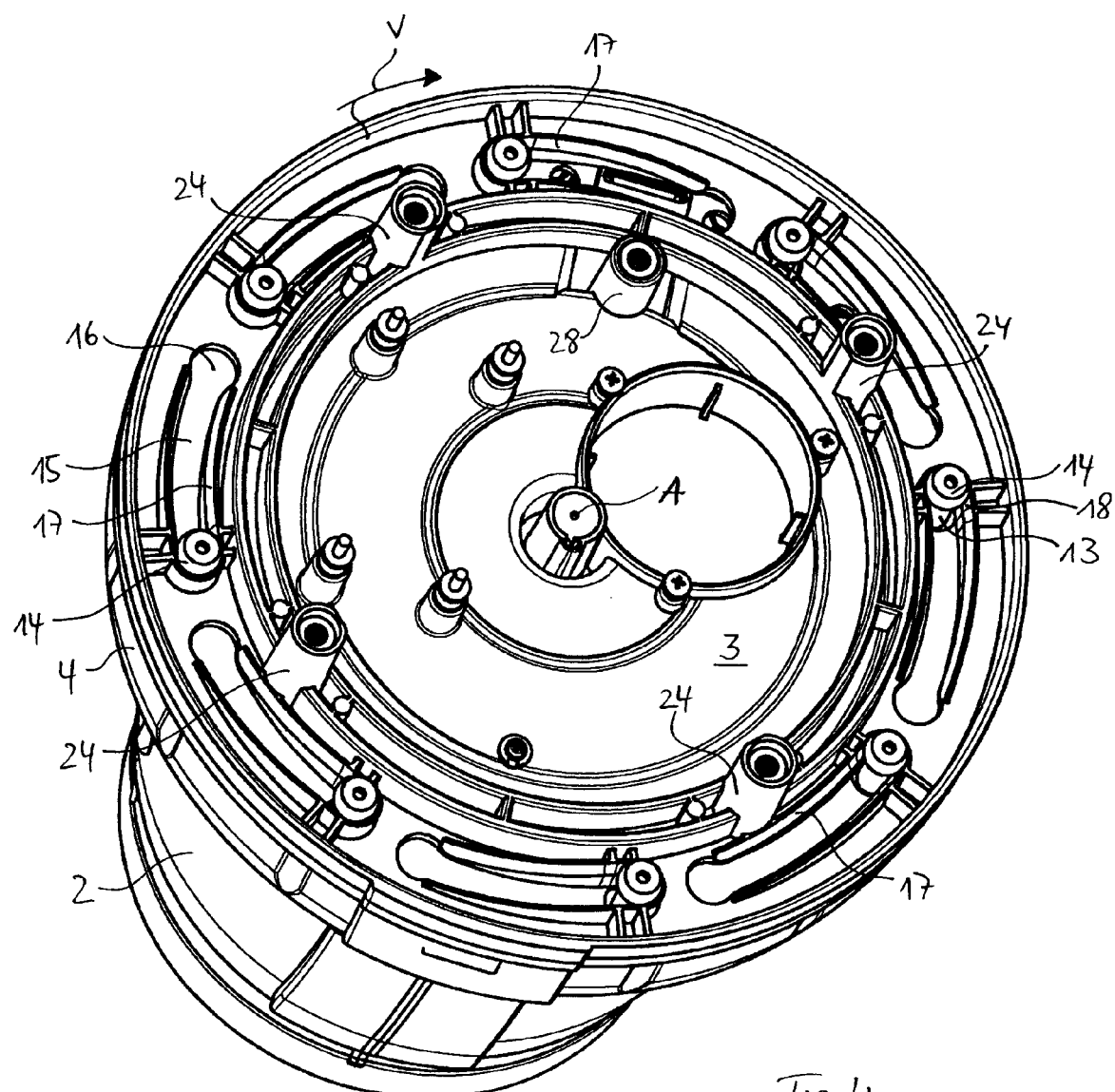
FIG. 4 the elements of FIG. 3, assembled.

As can be seen in particular in FIGS. 3 and 4, the recesses 15 are shaped like a slotted hole and are arranged equidistantly, annularly and rotationally symmetrically about the central longitudinal housing axis A. The displacement movement V required for dosing the container can thus be effected simply by oppositely turning the two housing parts 2, 4 relative to one another. At the same time, by means of the plurality of the projections 13, 14 and recesses 15 a uniform sealing action is provided without there being the risk of canting.

When the upper housing part 4 is designed, for example, in such a way that it is closed in the upward direction with the exception of the nozzle 7, the pressurized water container could be formed by the housing parts 2 and 4 alone in combination with a corresponding seal. However, in the illustrated embodiment between the housing parts 2 and 4 a separation element 3 is arranged as a sealing plate. The sealing plate 3 has holes 19 that match the projections 13, 14 and through which the pins 13 of the projections 13, 14 extend when the container is closed. The holes 19 have such a size that the spherical heads 14 of the projections 13, 14 pass through them. Accordingly, the sealing plate 3 can be displaced only minimally relative to the lower housing part 2, i.e., only inasmuch as the diameter of the holes 19 is greater than that of the pins 13. By means of a projections 23 of the sealing plate 3, as shown in FIG. 7, a sealing ring 22 is squeezed upon closing of the container against the inner wall of the lower housing part 2 and in this way a safe sealing action is achieved. The sealing plate 3 thus contributes to a long service life of the sealing ring 22 because the sealing ring, upon closing or opening of the container, is essentially only compressed and must not absorb any shearing stress. Shearing stress is prevented in this embodiment by gliding of the housing part 4, embodied as a closure ring, on the sealing plate 3.

In the fountain jet generator illustrated in the Figures, the upper housing part 4, 5 is of a two-part configuration, i.e., comprised of the closure ring 4 provided with the recesses 15 and forming a base and comprised of the lid 5. The lid 5 has the shape of a hood and is connected to the base 4 by means of separate fastening elements. In the illustrated embodiment the fastening elements are screws, not illustrated, that can be screwed through penetrations 25 of the hood 5 into threaded sleeves 24 of the base 4. Since this screwing action does not provide any further connection with the sealing plate 3 or the lower housing part 2, the hood 5 and the closure ring 4 can be removed together from the housing part 2 without the fastening elements having to be released. This is, for example, beneficial when it is only necessary to exchange filter sponges arranged in a receiving space F in the lower housing part 2.

Figure 2:
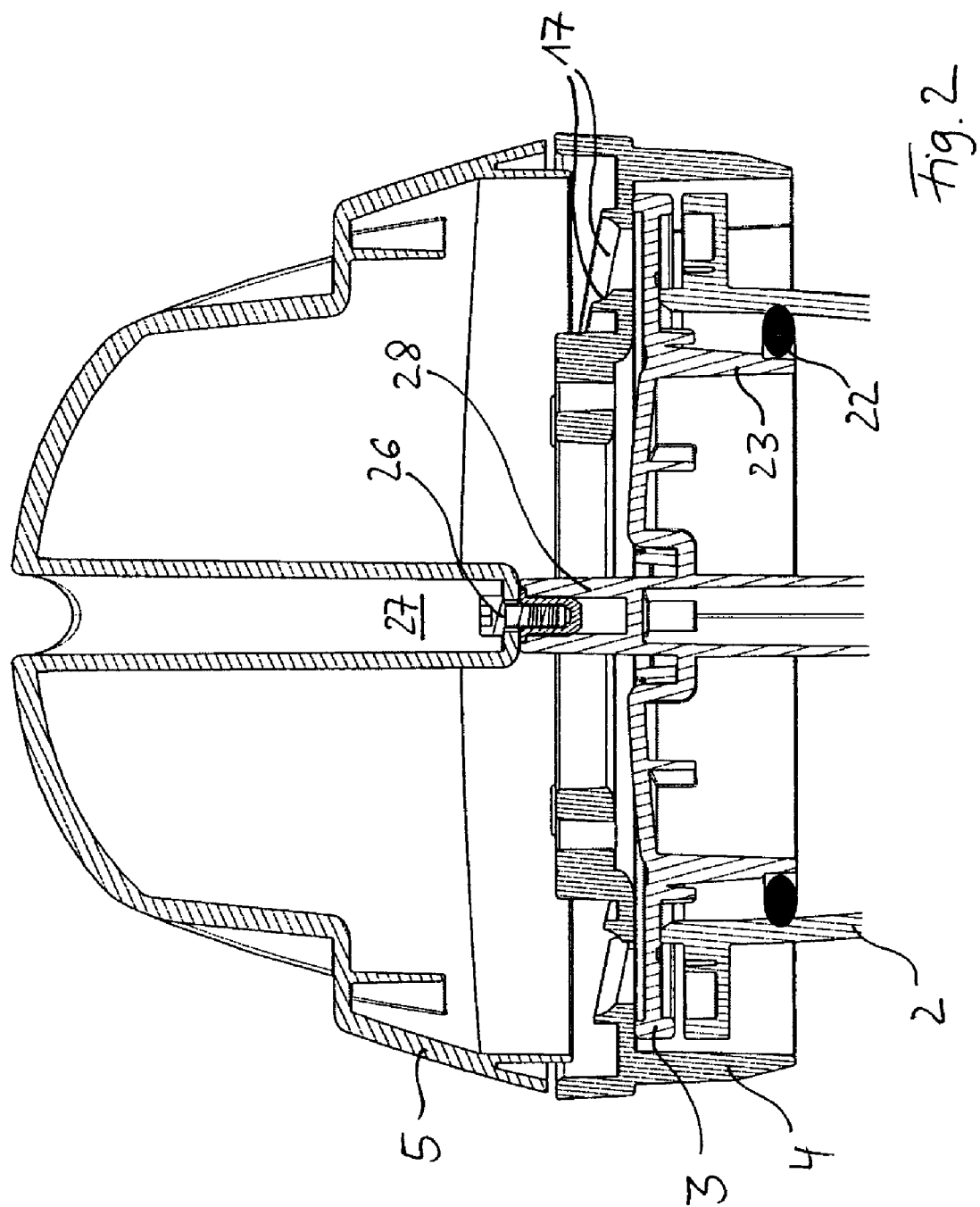
FIG. 2 a partial section in the direction II-II through the article of FIG. 1 with the lid in position.

In order to prevent accidental opening of the container by oppositely turning the housing parts 2 and 4 relative to one another, preferably a safety element 26 is provided that connects the housing part 4, 5 with the other housing part 2 or the sealing plate 3. In the illustrated embodiment, this securing action against opening is realized indirectly by a safety element 26 in the form of a screw that, as illustrated in FIG. 2, connects the lid 5 to the sealing plate 3. In this way, indirectly also the housing parts 2 and 4 are connected to one another so as to prevent relative rotation because the safety element or screw 26 is screwed through an eccentrically arranged opening 27 into a corresponding receptacle 28. The safety element 26 as well as the receptacle 28 can be of a small size because they are provided only as an additional securing means against accidental opening while the entire pressure forces in the water container are absorbed by the force-locking and positive-locking connection by means of the projections 13, 14, the recesses 15, and the sealing ring 22.

Advantageously, the pressurized water container according to the invention can be opened and closed by a single person without operating error and enables in this connection in a simple way access to the desired container areas for inspection purposes.

The specification incorporates by reference the entire disclosure of German priority document 10 2007 014 570.7 having a filing date of Mar. 23, 2007.

While specific embodiments of the invention have been shown and described in detail to illustrate the inventive principles, it will be understood that the invention may be embodied otherwise without departing from such principles.

What is claimed is:

1. A pressurized water container for water fountains, ponds, swimming pools, and aquariums, comprising:
    a housing comprising a first and a second housing parts and at least one seal arranged between the first and second housing parts, wherein the first and second housing parts are connectable to one another in a lockable way;
    wherein the first and second housing parts have projections and matching recesses, wherein the projections engage the recesses and, by a displacement of the first and second housing parts relative to one another in opposite directions, the projections and recesses pull the first and second housing parts toward one another and clamp the first and second housing parts against one another in a clamped position and when reversing the displacement the first and second housing parts are released;
    wherein the housing comprises a separate third housing part that is a sealing plate disposed between the first and second housing parts and is provided with holes through which the projections extend;
    wherein the third housing part in the clamped position acts on the at least one seal and forces the at least one seal circumferentially against one of the first and second housing parts.

2. The pressurized water container according to claim 1, wherein the projections are arranged on the first housing part and the recesses are arranged on the second housing part.

3. The pressurized water container according to claim 1, wherein the projections have terminal widened portions and the recesses partially have tapering portions.

4. The pressurized water container according to claim 3, wherein the projections are pins with terminal spherical heads and the spherical heads form the terminal widened portions.

5. The pressurized water container according to claim 1, wherein the recesses have guides that determine a displacement direction of the at least two housing parts relative to one another.

6. The pressurized water container according to claim 5, wherein the guides engage terminal widened portions of the projections.

7. The pressurized water container according to claim 5, wherein the guides are formed as an ascending ramp.

8. The pressurized water container according to claim 5, wherein the guides in the area in which the projections are positioned when the housing is closed are at least slightly recessed relative to the projections.

9. The pressurized water container according to claim 5, wherein the recesses are in the form of a slotted hole, respectively.

10. The pressurized water container according to claim 1, wherein the projections and the recesses are arranged about a housing axis of the housing at an identical spacing, respectively.

11. The pressurized water container according to claim 1, wherein the holes in the third housing part have a size allowing at most a minimal displacement of the third housing part relative to the first housing part that is provided with the projections.

12. The pressurized water container according to claim 1, wherein the first housing part is at least of a two-part configuration and comprises a base and a lid, wherein the recesses, the projections, or the recesses and the projections are formed in or on the base.

13. The pressurized water container according to claim 12, wherein the lid and the base can be connected to each other by at least one separate fastening element.

14. The pressurized water container according to claim 1, wherein the first and second housing parts are securable by at least one safety element against displacement relative to one another.

15. The pressurized water container according to claim 14, wherein the at least one safety element connects the first housing part to the second housing part or to the third housing part arranged between the first and second housing parts.

16. The pressurized water container according to claim 14, wherein the at least one safety element connects the first housing part to the second housing part and to the third housing part arranged between the at least two housing parts.

17. The pressurized water container according to claim 15, wherein the first housing part comprises at least a base and a lid, wherein the at least one safety element connects the lid with the second housing part or the third housing part arranged between the first and second housing parts.

18. The pressurized water container according to claim 15, wherein the first housing part comprises at least a base and a lid, wherein the at least one safety element connects the lid with the second housing part and the third housing part arranged between the first and second housing parts.

19. The pressurized water container according to claim 1, comprising a receiving space for filter elements.

20. A fountain jet generator comprising a pressurized water container according to claim 1.

* * * * *